(12) United States Patent
Williams et al.

(10) Patent No.: US 12,058,201 B2
(45) Date of Patent: Aug. 6, 2024

(54) READ ACCESS FOR COMPUTATIONAL RESULTS OF A DISTRIBUTED NETWORK

(71) Applicant: DFINITY STIFTUNG, Zurich (CH)

(72) Inventors: Dominic Williams, Palo Alto, CA (US); Jan Camenisch, Thalwil (CH); Johan Granstrom, Kilchberg (CH); David McCauley, Palo Alto, CA (US); Andreas Rossberg, Munich (DE); Maciej Wos, Tokyo (JP)

(73) Assignee: DFINITY STIFTUNG, Zurich (CH)

( * ) Notice: Subject to any disclaimer, the term of this patent is extended or adjusted under 35 U.S.C. 154(b) by 0 days.

(21) Appl. No.: 17/769,847

(22) PCT Filed: Oct. 18, 2019

(86) PCT No.: PCT/EP2019/078409
§ 371 (c)(1),
(2) Date: Apr. 18, 2022

(87) PCT Pub. No.: WO2021/073756
PCT Pub. Date: Apr. 22, 2021

(65) Prior Publication Data
US 2022/0377133 A1    Nov. 24, 2022

(51) Int. Cl.
*H04L 67/10*  (2022.01)
*G06F 11/14*  (2006.01)

(52) U.S. Cl.
CPC .......... *H04L 67/10* (2013.01); *G06F 11/1469* (2013.01); *G06F 2201/84* (2013.01)

(58) Field of Classification Search
CPC ......... H04L 67/10; H04L 69/40; H04L 63/12; H04L 67/1097; H04L 9/3255; H04L 9/50;
(Continued)

(56) References Cited

U.S. PATENT DOCUMENTS

| 10,693,994 B2 * | 6/2020 | Chen | H04L 9/0637 |
| 2016/0350749 A1 * | 12/2016 | Wilkins | G06Q 20/401 |
| 2018/0152289 A1 * | 5/2018 | Hunt | H04L 9/0637 |

OTHER PUBLICATIONS

Timo Hanke, et al., "DFINITY Technology Overview Series Consensus System", Proceedings of Technology Overview Series, Jan. 23, 2018, 16 pages.
(Continued)

*Primary Examiner* — Cheikh T Ndiaye
(74) *Attorney, Agent, or Firm* — Mannava & Kang, P.C.

(57) ABSTRACT

According to an embodiment of a first aspect of the invention, there is provided a distributed network comprising a plurality of nodes. Each of the plurality of nodes is configured to run one or more computational units comprising its own unit state. The network is configured to individually execute, by an execution subset of the plurality of nodes, s set of execution messages in a deterministic manner, thereby mutating the unit states of one or more of the computational units of the execution subset. The network is further configured to regularly make, by the nodes of the execution subset, a read snapshot of the unit states of the one or more computational units of the execution subset and to provide, by one or more nodes of the execution subset, user access to the read snapshot.
Further aspects of the invention relate to a corresponding computer-implemented method, a node, a computer program product and a software architecture.

18 Claims, 12 Drawing Sheets

(58) Field of Classification Search
CPC ... G06F 11/1469; G06F 2201/84; Y04S 40/20
See application file for complete search history.

(56) References Cited

OTHER PUBLICATIONS

International Search Report for International Application No. PCT/EP2018/078409 mailed on Jun. 30, 2020, pp. 2.

* cited by examiner

READ ACCESS FOR COMPUTATIONAL RESULTS OF A DISTRIBUTED NETWORK

CLAIM FOR PRIORITY

The present application is a national stage filing under 35 U.S.C. 371 of PCT application number PCT/EP2019/078409, having an international filing date of Oct. 18, 2019, the disclosures of which are hereby incorporated by reference in their entireties.

TECHNICAL FIELD

The present invention pertains to a distributed network comprising a plurality of nodes. Each of the plurality of nodes is configured to run one or more computational units.

Further aspects relate to a corresponding method for providing a user of a distributed network access to computational results computed by the distributed network, in particular by nodes of the distributed network. Further aspects relate to a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

Accordingly, there is a need for distributed networks with enhanced functionalities.

DISCLOSURE OF THE INVENTION

Accordingly, one object of an aspect of the invention is to provide a distributed network with enhanced functionalities, in particular a network that provides users of the network enhanced access functionalities or access features to access computational results of the distributed network.

According to an embodiment of a first aspect of the invention, there is provided a distributed network comprising a plurality of nodes, in particular a plurality of computing nodes. Each of the plurality of nodes is configured to run one or more computational units and each of the computational units comprises its own unit state. The network is further configured to individually execute, by an execution subset of the plurality of nodes, a set of execution messages in a deterministic manner, thereby mutating the unit states of one or more of the computational units of the execution subset. The network is further configured to regularly make, by the nodes of the execution subset, a read snapshot of the unit states of the one or more computational units of the execution subset and to provide, by one or more nodes of the execution subset, user access to the read snapshot.

Such a distributed network facilitates user access to computational results of the distributed network in an efficient way, in particular user access to computational results that have been computed by one or more computational units of the network. More particularly, the computational results are provided by the read snapshots. A read snapshot may be defined as a snapshot that can be read and hence accessed by a user of the distributed network. The read snapshot is performed regularly and records the unit states of the computational units at a single consistent point in time.

A computational unit may be defined as a piece of software that is running on a node of the network and which has its own unit state. More particularly, a computational unit may be defined as a deterministic program with orthogonal persistence. Furthermore, each node of the network runs one or more computational units and hence maintains the unit state of one or more computational units.

According to embodiments, the unit states of the computational units of the execution subset are replicated across the execution subset. This may be in particular facilitated by performing an active replication in space of the unit state of the computational units on each node of the execution subset. According to embodiments, the unit state may comprise in particular an input queue, an output queue, a system state and an application or user state.

According to an embodiment, the network is configured to regularly perform, by a consensus subset of the plurality of nodes, a consensus protocol configured to reach a consensus on a selection of execution messages from a current or in other words currently available set of the set of execution messages.

Hence the processing and execution of the current set of execution messages is performed in a two-stage approach according to embodiments.

More particularly, at a first step, a consensus subset of the nodes performs a consensus protocol in order to reach a consensus on the selection of the currently available execution messages. The number of nodes of the consensus subset may be chosen in dependence on the needs of the respective network, in particular in terms of efficiency on the one hand and security on the other hand. Then, at a second step, the execution subset of the nodes performs the execution of the selected execution messages in a deterministic manner. The number of the nodes of the execution subset may also be chosen in dependence on the needs of the respective network.

According to some embodiments, the consensus subset and the execution subset may not overlap at all. According to other embodiments, the consensus and the execution subset may partially overlap. According to yet other embodiments, the consensus subset may by a subset of the execution subset, i.e. the nodes of the consensus subset are also nodes of the execution subset. According to embodiments, the nodes of the execution subset may form a subnet of the network. The execution subset may also be denoted as first subset and the consensus subset may also be denoted as second subset.

According to an embodiment, the network is configured to execute a computation on the read snapshot by a computational unit of one or more nodes of the execution subset and to provide a result of the computation to a user.

Such an embodiment allows to provide users access with enhanced functionalities. More particularly, the user may request computations to be performed on the read snapshots. This allows to implement operations such as sorting a result before providing it to the user.

Contrary to the unit states of the computational units, the computations on the read snapshot are not replicated according to embodiments. Rather, they may be performed separately and independently by each node of the execution subset upon receiving e.g. a corresponding read query by a user.

According to an embodiment, the network is configured to receive by one or more nodes of the execution subset, in particular by a computational unit of the one or more nodes of the execution subset, a read query from a user and to load the unit state of the corresponding computational unit associated with the read query. The unit state may be in particular loaded from the memory of the respective node that stores the read snapshot and may hence correspond to the unit state of the latest read snapshot. The network is then further configured to run the respective computational unit with the read query. This may in particular comprise a computation on the respective unit state of the computational unit that is stored in the read snapshot. The read query is run separately and independently by each node of the execution subset and the corresponding computations are not replicated over the nodes of the execution subset.

Finally, the results of the read query may be returned to a user.

Such an embodiment also allows enhanced functionalities to define and process the read queries. Running the computational unit with the read query may implement functions such as sorting, searching, filtering etc.

A read query may be generally defined as a query that does not persistently modify the unit state of a computational unit. While a read query may temporarily modify a user state of a computational unit such as memories, global variables and tables, all such modifications are discarded once the read query has been fully processed.

According to an embodiment, the network is further configured to certify one or more parts of the read snapshot. This generates one or more certified parts of the read snapshot.

Such a certification may enhance the trust and confidence of the user in the snapshot. More particularly, the user may verify the certified parts of the read snapshot.

According to an embodiment, the network is further configured to certify the one or more certified parts of the read snapshot by a majority of the nodes of the execution subset. According to such an embodiment a majority of the nodes have to agree on the certified parts of the read snapshot.

According to an embodiment, the network is further configured to certify the one or more parts of the read snapshots by generating, by the majority of the execution subset of nodes, a signature on the one or more parts of the read snapshot and by making the signature available to a user.

Such a signature allows a user to verify the certified parts of the snapshot.

According to embodiments, the execution subset of nodes is configured to run a threshold-signature algorithm to certify the one or more certified parts. Hence the signature may be embodied as a threshold-signature.

According to another embodiment, the execution subset of nodes may be configured to run a multi-signature algorithm.

Such a multi-signature is a digital signature which allows the nodes of the execution subset to sign the snapshot jointly. Such a joint signature is usually more compact than a collection of individual signatures of all nodes of the execution subset.

According to yet other embodiments, the execution subset of nodes may be configured to perform individual signatures by the nodes of the execution subset.

According to embodiments, the one or more certified parts of the read snapshots are variables of the unit state.

According to an embodiment, the network is further configured to store, by the nodes of the execution subset, the read snapshots of the unit states in a cache memory.

Such an approach is advantageous in terms of speed and efficiency.

According to an embodiment, the network is further configured to regularly make, by the nodes of the execution subset, a recovery snapshot of the unit states of the one or more computational units of the execution subset and to certify, by a majority of the nodes of the execution subset, the recovery snapshot.

Such a recovery snapshot may also be denoted as full snapshot. A recovery snapshot may be defined as a snapshot that comprises all state of the nodes of the execution subset that is needed to restore a node. This may in particular include all data of a messaging component and all input blocks.

According to an embodiment, the network is configured to hash the recovery snapshot. Such a hash is an efficient way of certifying the recovery snapshot and to allow its verification.

According to an embodiment, the network is configured to store the recovery snapshot persistently at least until a subsequent recovery snapshot has been made.

This ensures that a network node and its corresponding states may always be recovered.

According to an embodiment, the network is configured to perform the read snapshots at a first rate and the recovery snapshots at a second rate, wherein the first rate is higher than the second rate.

Such an embodiment provides several advantages. On the one hand it allows a timely access to the computational results of the network, namely at an update rate that corresponds to the first rate. On the other hand, it still ensures that a full recovery of the nodes of the execution subset is always possible.

According to an embodiment, the execution messages shall encompass all messages to be executed and shall in particular encompass unit-to-unit messages exchanged between computational units of the network and mutating queries received from a user of the network. A mutating query, which may also be denoted as ingress message, may be e.g. an execution request addressed to a computational unit of the network to perform some computational tasks.

According to an embodiment, each node of the consensus subset comprises a consensus component configured to perform the consensus protocol.

According to embodiments, each node of the execution subset comprises an execution component configured to execute the selection of execution messages and a messaging component configured to receive the selection of execution messages from the consensus component and to provide the selection of execution messages to the execution component. In addition, each node may comprise a state manager component configured to manage and store the read snapshots, a state reader component configured to handle read queries from users of the network and/or an ingress message handler component configured to handle mutating queries from users of the network.

Such components facilitate an efficient implementation of the various functionalities of the distributed network.

According to an embodiment, the network is configured to perform a plurality of processing loops in a sequential order with an increasing height index N, wherein N is an increasing integer. The plurality of processing loops are configured to perform, at a first loop step, the consensus protocol, to individually execute, at a second loop step, the selection of execution messages and to make, at a third loop step, the read snapshot. Furthermore, the network is configured to provide, during the processing loop with the height index N, user access to the read snapshot made at the end of a previous height index, in particular the previous height index N−1. In other words, during a current processing loop, the user may access the snapshot of the result of the previous processing loop. In yet other words, the read snapshot freezes the read state of the respective computational unit for one processing loop or loop cycle, while concurrently executing the next processing loop.

According to a further embodiment, the consensus protocol is configured to receive and process the execution messages from the current set of execution messages, to generate a queue of input blocks from the execution messages according to a predefined consensus mechanism and to provide the queue of input blocks to a messaging protocol. The messaging protocol, which is run by the messaging component, is configured to process the input blocks and to schedule, by a scheduler, the execution messages of the input blocks for execution. The messaging protocol may be advantageously clocked by the input blocks received from the consensus protocol. This facilitates an efficient and synchronous processing of the input blocks. Furthermore, the state manager component may be advantageously configured to make the read snapshots at processing boundaries of the input blocks.

According to an embodiment, the consensus protocol is further configured to add one or more execution parameters to the input blocks. The execution parameters may be e.g. a random seed, a designated execution time and/or a height index.

Such execution parameters may further facilitate and enhance the efficiency and/or security of the processing of the input blocks and its corresponding messages.

The random seed may be used e.g. to achieve pseudo-randomness in execution if needed. The height index may e.g. be an ascending index of the input blocks to facilitate an in-order processing of the input blocks.

According to a further embodiment, the network may be configured to elect members of a committee from the plurality of nodes according to a predefined election scheme and to perform the consensus protocol with the elected members of the committee. According to such an embodiment the elected members form the consensus subset.

According to embodiments, the network is configured to perform as consensus protocol a proof-of-stake consensus protocol.

The proof-of-stake consensus protocol aims at reaching a consensus on the selection and processing order of execution messages (inter-subnet messages and mutating queries), in particular on the next input block that shall be created for further processing.

According to a further embodiment, the distributed network comprises a plurality of subnets. Each of the plurality of nodes is allocated to one of the plurality of subnets. Each of the plurality of nodes is configured to run a mainnet protocol client and a subnet protocol client. The subnet protocol client is configured to regularly perform the consensus protocol, to individually execute the selection of execution messages, to regularly make the read snapshot and to provide user access to the read snapshot. The mainnet protocol client is configured to distribute configuration data to the plurality of subnets.

According to embodiments, each of the subnets is configured to replicate the set of computational units, in particular the states of the computational units, across the subnet. As a result, the computational units of a respective subnet have always the same state, provided they behave honestly. The different subnets, in particular the computational units of the different subnets, may communicate with each other by exchanging inter-subnet messages via the messaging protocol and the consensus protocol.

According to some embodiments, all nodes of respective subnet may participate in the consensus protocol and hence form the consensus subset. According to other embodiments, the consensus protocol may be configured to elect members of a committee from the plurality of nodes of the subnet according to a predefined election scheme and to perform the consensus protocol with the elected members of the committee.

Such a network may achieve a high transaction rate and short finalization time as the committee may be significantly smaller than the full set of nodes of the subnet. Such an embodiment is in particular useful for large subnets comprising hundreds or thousands of nodes. The committee forming the consensus subset may then comprise only 20-60 nodes as an example. Hence the committee can act more efficiently than if all nodes in the subnet would be involved. Such a committee may also be denoted as notarization committee as it is entitled to notarize input blocks.

According to some embodiments a threshold relay scheme may be used. More particularly, networks according to embodiments of the invention may use a threshold relay, a distributed random beacon that is maintained by subsequent notarization committees of randomly selected nodes of the respective subnet. The output of the random beacon is used as entropy in the system, e.g., for ranking block proposers and for composing new generations of committees. Such a threshold relay scheme is described e.g. in the document by Timo Hanke, Mahnush Movahedi and Dominic Williams, DFINITY Technology Overview Series, Consensus System, Rev.1, https://dfinity.org/static/dfinity-consensus0325c35128c72b42df7dd30c22c41208.pdf According to an embodiment, the network further comprises a networking component configured to run a networking protocol. The networking protocol may comprise a unicast component configured to perform a node-to-node communication, a broadcast component configured to perform an intra-subnet communication and/or a cross-net component configured to perform an inter-subnet communication.

According to an embodiment of a method aspect of the invention, a computer-implemented method for providing a user of a distributed network access to computational results computed by the distributed network is provided. The distributed network comprises a plurality of nodes. The method comprises a step of running, on each of the plurality of nodes, one or more computational units, and a step of regularly performing, by a consensus subset of the plurality of nodes, a consensus protocol configured to reach a consensus on a selection and processing order of execution messages from a current set of execution messages. The method comprises a further step of individually executing, by an execution subset of the plurality of nodes, the selection of execution messages in the processing order in a deterministic manner. This mutates the unit states of one or more of the computational units of the execution subset. The method comprises further steps of regularly making, by the nodes of the execution subset, a read snapshot of the unit states of the one or more computational units of the execution subset and providing, by one or more nodes of the execution subset, user access to the read snapshot.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

Figure 1:
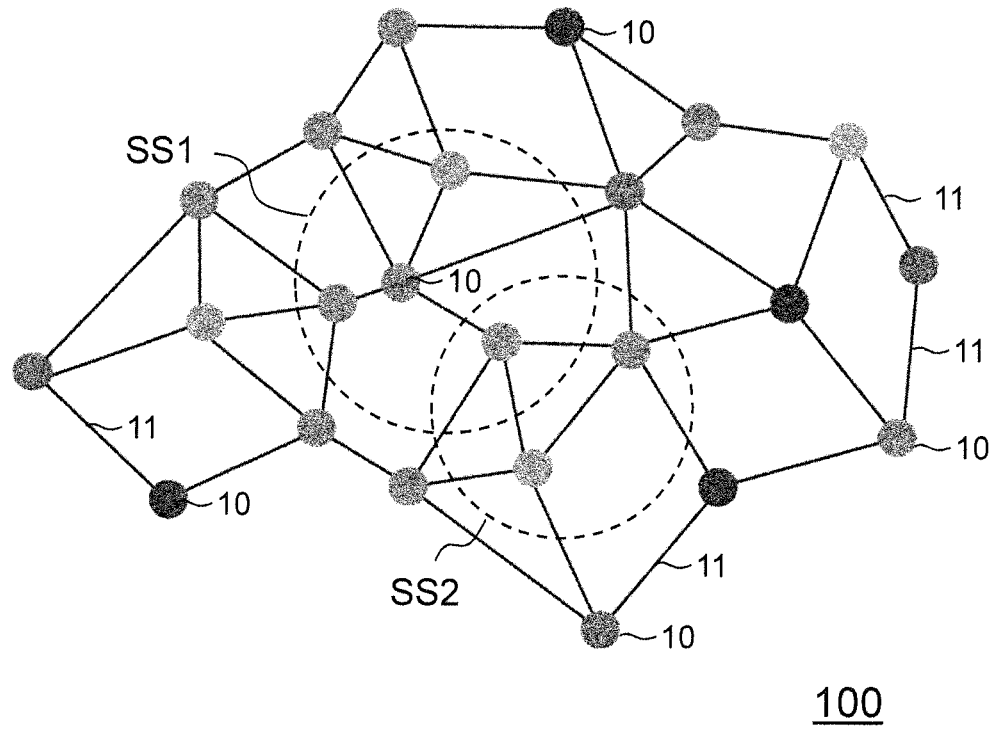
FIG. 1 shows an exemplary diagram of a distributed network according to an embodiment of the invention.

FIG. 1 shows an exemplary block diagram of a distributed network 100 according to an embodiment of the invention. The distributed network 100 comprises a plurality of nodes 10, which may also be denoted as network nodes 10 or computing nodes 10. Each of the plurality of nodes 10 is configured to run one or more computational units. According to embodiments a computational unit shall be understood as a piece of software, in particular as a piece of software that comprises or has its own unit state.

The plurality of nodes 10 of the network 100 may be allocated to different subsets and/or subnets. Such allocations may change over time.

According to this embodiment, the network 100 comprises a consensus subset SS1 of nodes 10 and a execution subset SS2 of nodes 10.

The computational units that run on the nodes 100 can be used by a user of the network 100 to perform computational tasks. The computational units of the network 100 may execute in particular execution messages from a current set of execution messages. The execution messages may comprise in particular unit-to-unit messages which are exchanged between the computational units of the network and/or ingress messages, i.e. messages which are received from external sources, in particular from users of the network. The network 100 is configured such that at first a consensus protocol is performed to reach a consensus on a selection and processing order of execution messages from a respective current set of execution messages. The consensus protocol is advantageously not performed by all nodes of the network 100, but by only a subset of the nodes 10 of the network 100, which is in the following denoted as consensus subset SS1. The consensus subset SS1 may also be denoted as consensus subset. The nodes of the consensus subset SS1 are accordingly configured to run the consensus protocol to reach a consensus on a selection and processing order of execution messages from the current set of execution messages.

The execution of the execution messages is also advantageously not performed by all nodes of the network 100, but only by a subset of the nodes 10 of the network 100. This subset is in the following denoted as execution subset SS2 and may be also denoted as execution subset SS2.

The computational units of the execution subset SS2 then execute individually the selection of the execution messages in the processing order as agreed in the previous consensus step. Each of the computational units of the execution subset SS2 performs the execution in a deterministic manner and thereby mutates the unit states of the corresponding computational units of the execution subset SS2.

According to embodiments, a unit state shall be understood as all the data or information that is used by the computational unit, in particular the data that the computational unit stores in variables, but also data which the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments it is assumed that each node of the network keeps a local clock that is roughly synchronized with the clocks of the other nodes.

Figure 2:
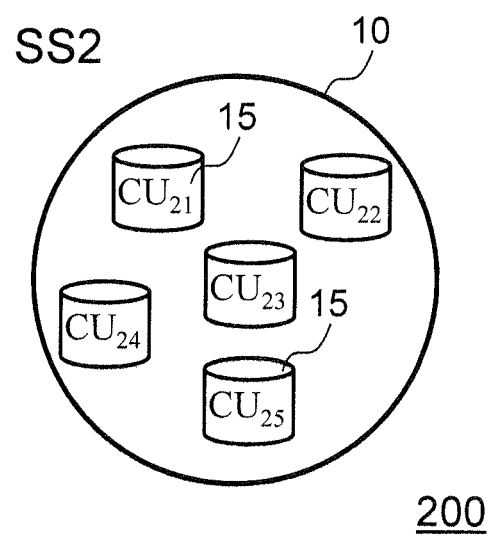
FIG. 2 illustrates in a more detailed way computational units running on an exemplary node of the network.

FIG. 2 illustrates in a more detailed way computational units 15 running on nodes 10 of the network 100. More particularly, FIG. 2 shows a node 10 of the subset SS2 of FIG. 1 on which five computational units 15 are run, more particularly the set of computational units $CU_{SS21}$, $CU_{SS22}$, $CU_{SS23}$, $CU_{SS24}$ and $CU_{SS25}$. The set of computational units $CU_{SS21}$, $CU_{SS22}$, $CU_{SS23}$, $CU_{SS24}$ and $CU_{SS25}$ runs on each node 10 of the subset SS2. Furthermore, the set of computational units $CU_{SS21}$, $CU_{SS22}$, $CU_{SS23}$, $CU_{SS24}$ and $CU_{SS25}$ is replicated across the whole subset SS2 such that each of the computational units $CU_{SS21}$, $CU_{SS22}$, $CU_{SS23}$, $CU_{SS24}$ and $CU_{SS25}$ has the same unit state, provided they behave honestly. This may be implemented in particular by performing an active replication in space of the unit state of the computational units $CU_{SS21}$, $CU_{SS22}$, $CU_{SS23}$, $CU_{SS24}$ and $CU_{SS25}$ on each of the nodes 10 of the subset SS2.

Figure 3:
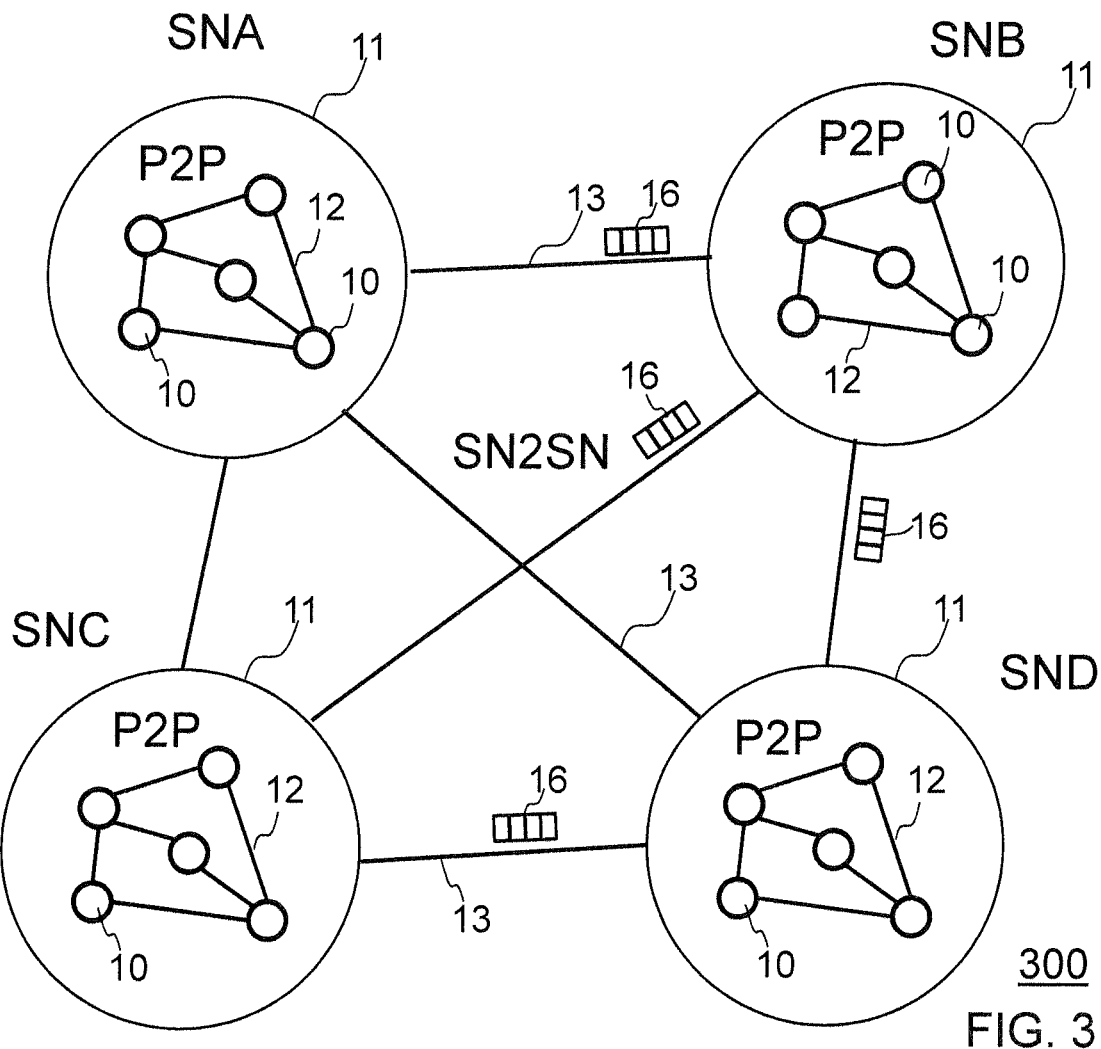
FIG. 3 shows an exemplary diagram of a distributed network according to an embodiment of the invention comprising a plurality of subnets.

FIG. 3 shows an exemplary block diagram of a distributed network 300 according to an embodiment of the invention.

The distributed network 300 comprises a plurality of nodes 10.

According to this embodiment, the plurality of nodes 10 are distributed over a plurality of subnets 11. In the example of FIG. 1, four subnets 11 denoted with SNA, SNB, SNC and SND are provided. The network 100 comprises communication links 12 for intra-subnet communication within the respective subnet 11 as well as communication links 13 for inter-subnet communication between different ones of the subnets 11. Accordingly, the communication links 12 may also be denoted as intra-subnet or Peer-to-Peer (P2P) communications links and the communication links 13 may also be denoted as inter-subnet or Subnet-to-Subnet (SN2SN) communications links.

Each of the plurality of subnets 11 is configured to run a set of computational units on each node 10 of the respective subnet 11.

According to embodiments of the invention the subnets 11 are configured to replicate the set of computational units across the respective subnet 11. More particularly, the subnets 11 are configured to replicate the unit state of the computational units across the respective subnet 11.

The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

According to embodiments it is assumed that at most ⅓ (a third) of the nodes in each subnet are corrupt so that artifacts generated and signed by the subnet can be fully trusted.

Figure 4:
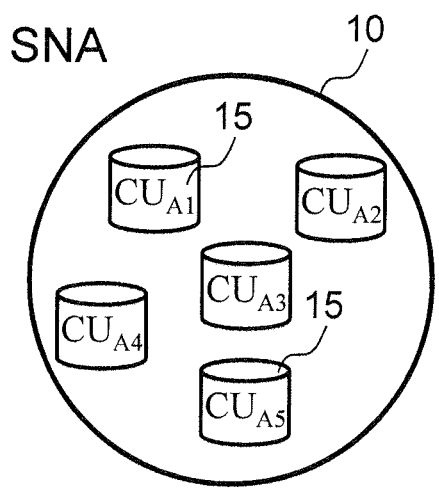
FIG. 4 illustrates in a more detailed way computational units running on the distributed network of FIG. 3.
Figure 4:
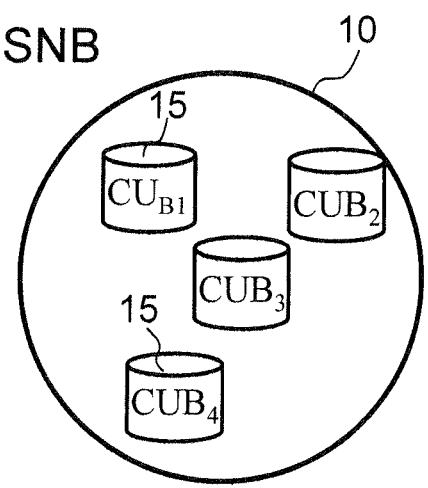

FIG. 4 illustrates in a more detailed way computational units 15 running on nodes 10 of the network 300. More particularly, FIG. 2 shows on the left side 401 a node 10 of the subset SNA of FIG. 1 on which five computational units 15 are run, more particularly the set of computational units $CU_{A1}$, $CU_{A2}$, $CU_{A3}$, $CU_{A4}$ and $CU_{A5}$. The set of computational units $CU_{A1}$, $CU_{A2}$, $CU_{A3}$, $CU_{A4}$ and $CU_{A5}$ runs on each node 10 of the subnet SNA. Furthermore, the set of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ has the same unit state. This may be implemented in particular by performing an active replication in space of the unit state of the computational units $CU_{A1}$, $CU_{A2}$, $CU_{A3}$, $CU_{A4}$ and $CU_{A5}$ on each of the nodes 10 of the subnet SNA.

Furthermore, FIG. 4 shows on the right side 402 a node 10 of the subnet SNB of FIG. 1 on which four computational units 15 are run, more particularly the set of computational units $CU_{B1}$, $CU_{B2}$, $CU_{B3}$ and $CU_{B4}$. The set of computational units $CU_{B1}$, $CU_{B2}$, $CU_{B3}$ and $CU_{B4}$ runs on each node 10 of the subnet SNB. Furthermore, the set of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and $CU_{B4}$ has the same unit state, e.g. by performing an active replication in space of the unit state as mentioned above.

Referring back to FIG. 3, the network 300 is configured to exchange inter-subnet messages 16 between the subnets SNA, SNB, SNC and SND via a messaging protocol and a consensus protocol. The consensus protocol is configured to reach a consensus on the processing order of the inter-subnet messages 16 at the respective receiving subnet. Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the processing order of the received inter-subnet messages 16.

According to embodiments, the network 300 may be configured to run the consensus protocol separately on each subnet. In other words, each of the subnets SNA, SNB, SNC and SND run its own consensus protocol separately and independently from the other subnets. Accordingly, each of the subnets SNA, SNB, SNC and SND can decide on its own and independently from the other subnets which received messages to process and in which order. Hence each of the subnets SNA, SNB, SNC and SND reaches a consensus on a per-subnet basis on the processing order of the received inter-subnet messages 16. Such a consensus may also be considered as a local consensus or a subnet-consensus.

This concept is illustrated in more detail with reference to FIG. 5.

Figure 5:
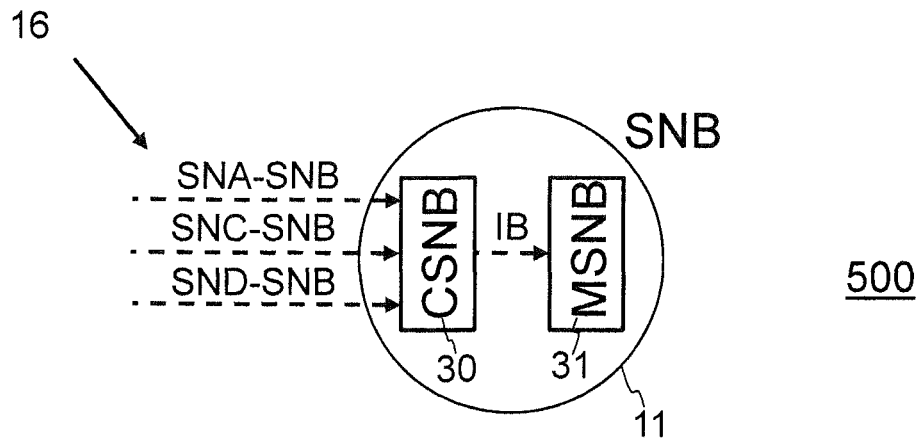
FIG. 5 shows a schematic illustration of inter-subnet messages which are received at a subnet of the network of FIG. 3.

FIG. 5 shows a schematic illustration of inter-subnet messages 16 which are received at the subnet 11, SNB of FIG. 3

The subnet SNB receives inter-subnet messages SNA-SNB from the subnet SNA, inter-subnet messages SNC-SNB from the subnet SNC and inter-subnet messages SND-SNB from the subnet SND. These pool of inter-subnet messages is processed by a consensus component 30, CSNB which runs locally a consensus protocol on the subnet SNB. Hence the consensus component 30 may be denoted as subnet consensus component.

The consensus component 30 generates a queue of input blocks IB from the inter-subnet messages according to a predefined consensus algorithm or mechanism and provides the queue of input blocks IB to a messaging component 31, MSNB which is configured to run a messaging protocol and to further process the input blocks IB.

According to embodiments each of the nodes 10 of a respective subnet 11 may participate in the consensus protocol. According to such embodiments, each of the subnets 11 may comprise e.g. 10 to 100 nodes, in particular 20 to 50 nodes. Such numbers may provide an advantageous compromise between security and efficiency.

According to other embodiments, the consensus protocol may be configured to elect members of a committee from the plurality of nodes 10 of the respective subnet 11 according to a predefined election scheme and to perform the consensus protocol only with the elected members of the committee. Such an approach is in particular useful for subnets with a larger number of nodes, e.g. for subnets with 1000 or more nodes.

Figure 6:
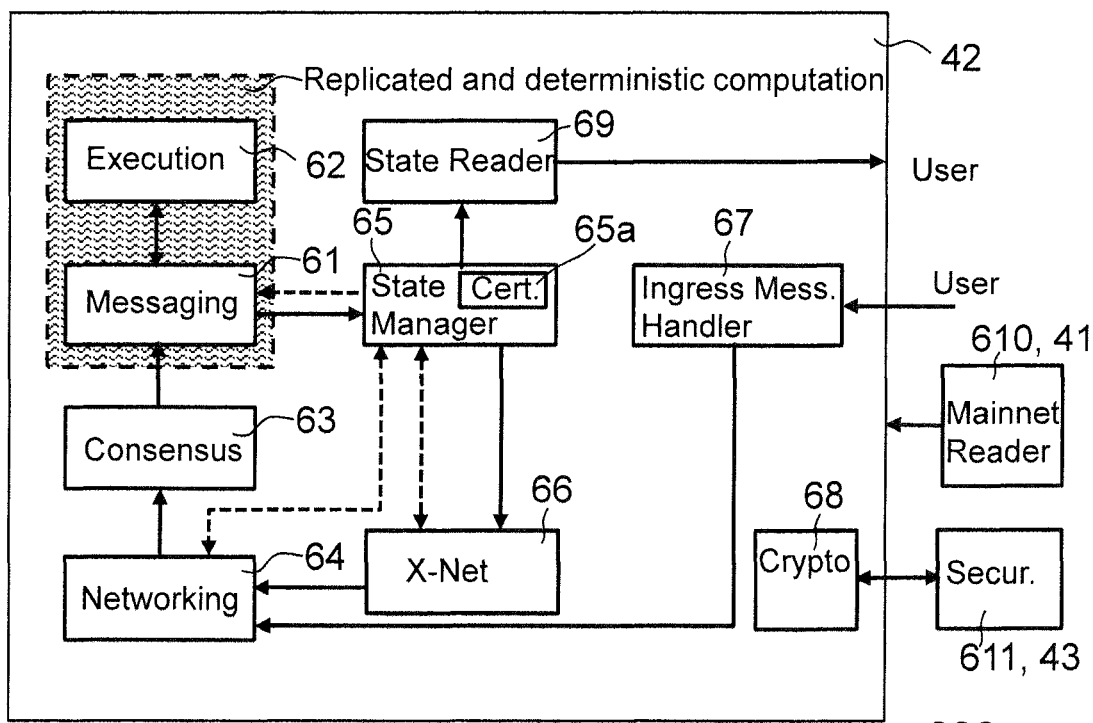
FIG. 6 shows a schematic block diagram of protocol components of a subnet protocol client.
Figure 13:
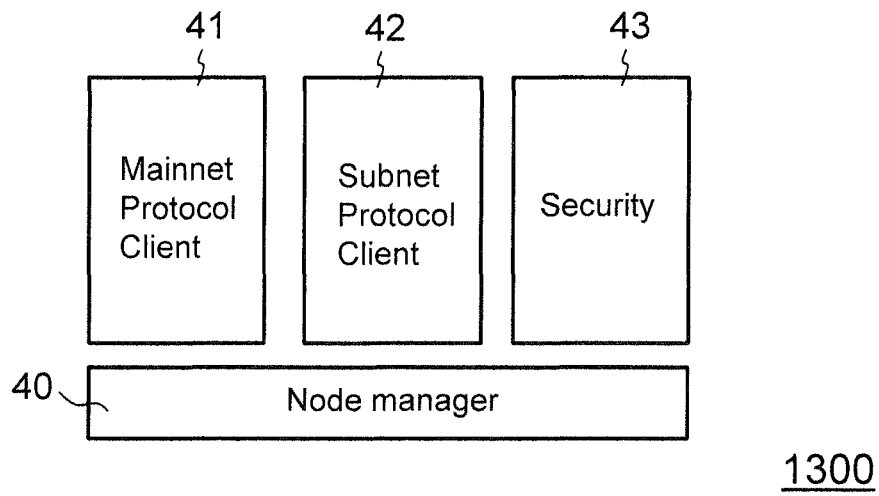
FIG. 13 illustrates main processes which are run on each node of the network according to an embodiment of the invention.

FIG. 6 shows a schematic block diagram of protocol components 600 of a subnet protocol client, e.g. of the subnet protocol client 42 as shown in FIG. 13.

Full arrows in FIG. 6 are related to execution messages which comprises unit-to-unit messages and ingress messages. Ingress messages may be in particular mutating-queries from a user. Dashed arrows relate to system information.

The protocol components 600 comprise a messaging component 61 which is configured to run the messaging protocol and an execution component 62 configured to run an execution protocol for executing execution messages, in particular for executing unit-to-unit messages and/or mutating queries. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress messages received from an external user of the network. The protocol components 600 comprise in addition a crypto-component 68. The crypto-component 68 co-operates with a security component 611, which may be e.g. embodied as the security application 43 as will be described subsequently with reference to FIG. 13. The protocol components 600 further comprise a state reader component 69 which is configured to receive read queries or in other word read requests from a user.

The state reader component 69 is configured to cooperate with the state manager component 65.

The read queries which are received and handled by the state reader component 69 are in particular embodied as non-mutating queries, i.e. they do not change persistently the unit state of the computational units. On the other hand, the ingress messages which are received from the ingress message handler component 67 and go through the consensus component 63, may be in particular embodied as mutating queries, i.e. they change the unit state of the respective computational unit that is executing the mutating query. As the read queries do not have to go through the consensus component 63, they can be made asynchronously on any node of the respective subnet and can hence be much faster.

Furthermore, the subnet-protocol client 42 may cooperate with a reader component 610, which may be a part of the mainnet protocol client 41 as described with reference to FIG. 13. The reader component 610 may provide information that is stored and distributed by the mainnet to the respective subnet protocol client 42. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components will access the crypto component 68 to execute cryptographic algorithms and the mainnet reader 610 for reading configuration information.

The execution component 62 receives from the messaging component 61 a unit state of the computational unit and an incoming message for the computational unit, and returns an outgoing message and the updated unit state of the computational unit. While performing the execution, it may also measure a gas or fuel consumption of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules, by a scheduler, messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65a. The certification component 65a is configured to certify the output streams of the respective subnet. This may be performed e.g. by a group signature of the computational units of the respective subnet.

The certification component 65a may be further configured to certify certain variables of the unit state, in particular certain variables of snapshots of the unit state as will be described below in more detail.

Figure 7:
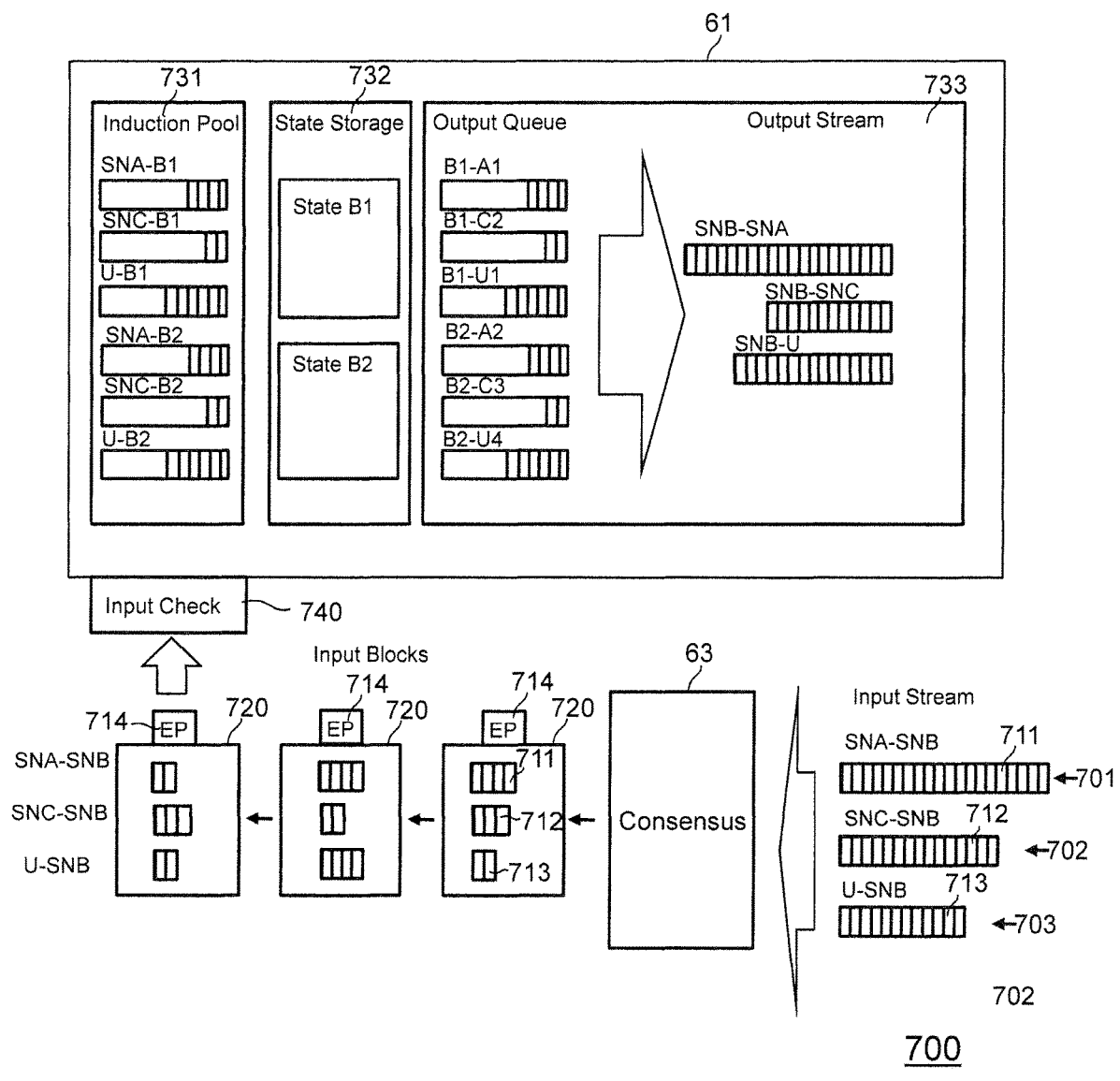
FIG. 7 shows an exemplary visualization of a workflow of the messaging protocol and the consensus protocol and the associated components.

FIG. 7 shows an exemplary visualization of a workflow 700 of the messaging protocol and the consensus protocol and the associated components, e.g. of the messaging component 61 and the consensus component 63 of FIG. 6. More particularly, FIG. 7 visualizes the workflow of inter-subnet messages exchanged between a subnet SNB and subnets SNA and SNC. Furthermore, the subnet SNB exchanges ingress messages with a plurality of users U.

Starting from the bottom right of FIG. 7, a plurality of input streams 701, 702 and 703 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB.

The inter-subnet messages 711 and 712 comprise unit-to-unit messages to be exchanged between the computational units of the different subnets as well as signalling messages. The signalling messages are used to acknowledge or not acknowledge a receipt of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC and the ingress messages 713 of the users U and to generate a queue of input blocks 720 from the inter-subnet messages 711, 712 and the ingress messages 713 according to a predefined consensus mechanism that is executed by the corresponding consensus protocol. Each input block 720 produced by consensus contains a set of ingress messages 713, a set of inter-subnet messages 711, 712 and execution parameters 714, EP. The execution parameters 714, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more pre-processing steps including one or more input checks. The input checks may be performed by an input check component 740.

The input checks may be performed with different granularity according to embodiments. At first, the input checks may be performed for the whole input block. Such checks may also be denoted as input block checks. These may comprise a check of the height of the next input block. If the height of the next input block is lower than expected next in sequence, then it is discarded. If the input block is not the expected next in sequence, then the messaging component 61 may trigger a node catch up protocol. If the input block is the next in sequence, then it is further processed by the messaging component 61.

The different types of messages (signalling messages, ingress messages, unit-to-unit messages) in the input blocks may be grouped together.

The input checks may further comprise an overload check to check whether the messaging component is currently overloaded and does not have enough capacity to perform the processing. If e.g. the relevant queue in the induction pool is full, the corresponding message may be rejected. Further input checks may comprise an in-order delivery check. To satisfy the in-order delivery requirement, messages can be annotated e.g. with sequence numbers. If a message with a sequence number is received, the messaging component 61 may check whether it has the expected number, and if not, may reject it. Furthermore, the input check component 740 may perform a validity check of the target destination, i.e. whether a message targets a computational unit that is active on the corresponding subnet.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, the messaging component 61 preprocesses the input blocks 720 by placing ingress messages, signalling messages and inter-subnet messages into the induction pool component 731 as appropriate. Signalling messages in the subnet streams are treated as acknowledgements of messages of the output queues which can be purged.

In this example, the induction pool component 731 comprises subnet-to-unit queues SNA-B1, SNC-B1, SNA-B2 and SNC-B2 as well as user-to-unit queues U-B1 and U-B2.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote messages from the computational unit B1 of subnet SNB to the computational unit A1 of subnet SNA. As another example, the messages B1-U1 denote messages from the computational unit B1 of subnet SNB to the user U1.

The output queue component 733 post-processes the resulting output queue of the messages by forming a set of per-subnet output streams to be certified, e.g. by the certification component 65a as shown in FIG. 6, and disseminated by other components. In this example, the per-subnet output streams SNB-SNA, SNB-SNC and SNB-U are provided.

The messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These messages go into the output queue component 733, which initially contains unit-to unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

Figure 8:
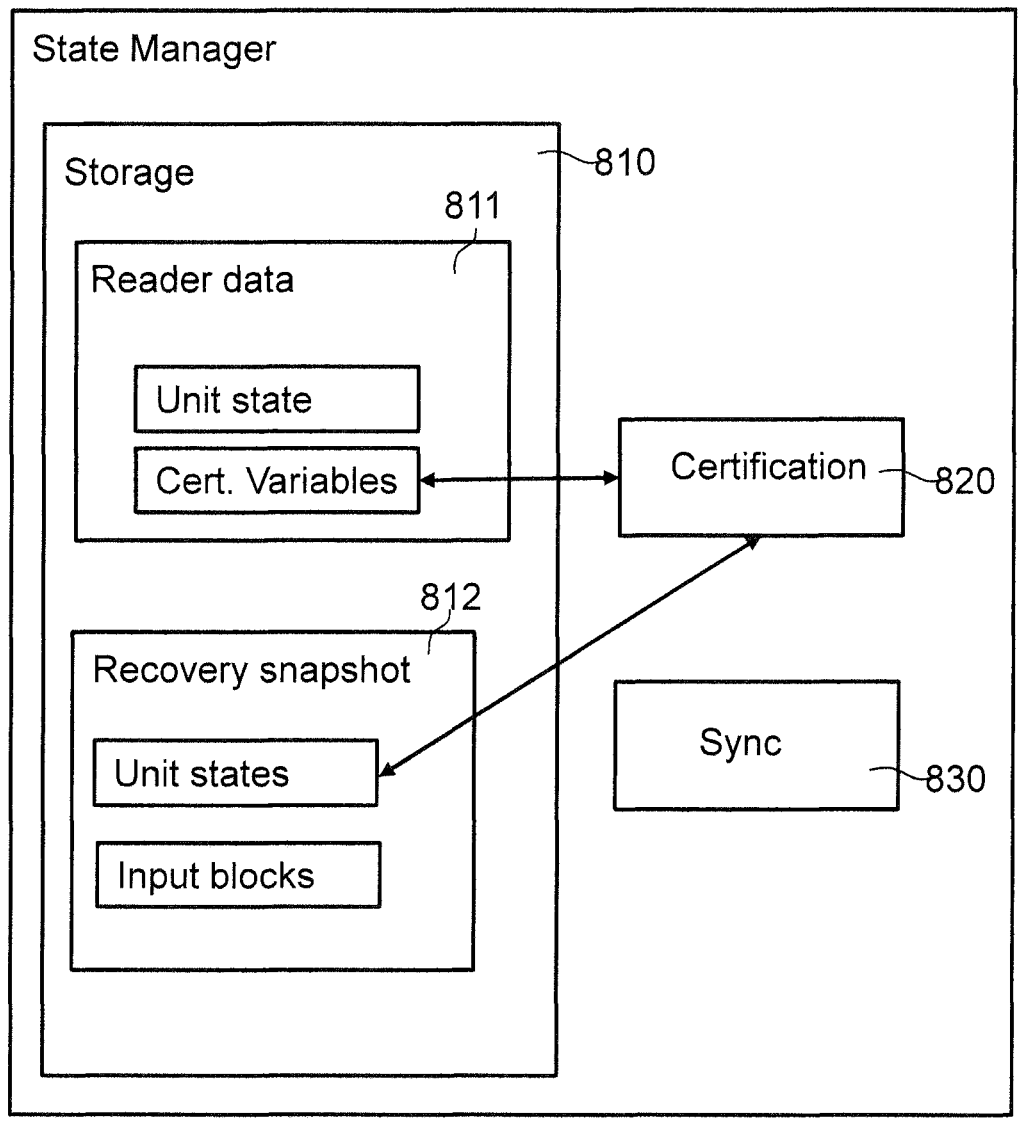
FIG. 8 shows a more detailed embodiment of a state manager component.

FIG. 8 shows a more detailed embodiment of a state manager component 800, e.g. of the state manager component 65 of FIG. 6.

The state manager component 800 comprises a storage component 810, a certification component 820 and a synchronization component 830. The storage component 810 is configured to store reader data 811, i.e. data that is available for read queries and that the state reader component 69 may access.

The reader data 811 comprises in particular a read snapshot that comprises data for read queries submitted from a user via the state reader component 69. The read snapshot comprises the latest unit states of the computational units of the respective node as well as one or more certified variables of the unit states that have been certified by the certification component 820. The certification component 820 may correspond to the certification component 65a of FIG. 6.

More particularly, the certification component 820 is configured to certify one or more parts or in other words subsets of the unit states, in particular variables. The certification may be triggered in particular by the messaging component 61, nominally at block processing boundaries. Certifying only one or more parts of the unit states, in particular only one or more certified variables, but not the whole unit state, increases the efficiency and speed of the nodes. While for these certified parts or certified variables it is sufficient to read them from a single node only, the user may provide additional read queries to further nodes of the execution subset to improve her confidence in the correctness of the non-certified parts of the snapshot. Furthermore, the user may verify that she talked to an authentic node that holds the state of the computational unit she is interested in.

According to embodiments, the certification component 820 is configured to run a threshold-signature algorithm to certify the one or more certified parts. According to another embodiment, the certification component 820 may be configured to run a multi-signature algorithm. According to yet other embodiments, the certification component 820 may be configured to perform individual signatures by the nodes of the execution subset.

The storage component 810 is further configured to store further data, in particular a recovery snapshot 812. Such a recovery snapshot 812 may also be denoted as full snapshot. According to embodiments, a recovery snapshot comprises all states of the nodes of the respective subnet or execution subset that is needed to restore a node of that subnet or execution subset. The recovery snapshot comprises in particular all data in the messaging component 61, including all unit states. The recovery snapshot further comprises all input blocks provided by the consensus component 63. Given the recovery snapshot including the input blocks, the messaging component 61 can recover its state for any block height of the subnet by replaying all input blocks up to that height. To allow other nodes to do this, the recovery snapshot will be certified by the execution subset or subnet according to embodiments. As according to embodiments the input blocks have already been certified by the consensus component 63, an additional certification of the input blocks of the recovery snapshot might be omitted. According to embodiments, the recovery snapshot may be hashed. According to an embodiment, the storage component 810 stores the recovery snapshot persistently at least until a subsequent recovery snapshot has been made.

Figure 9:
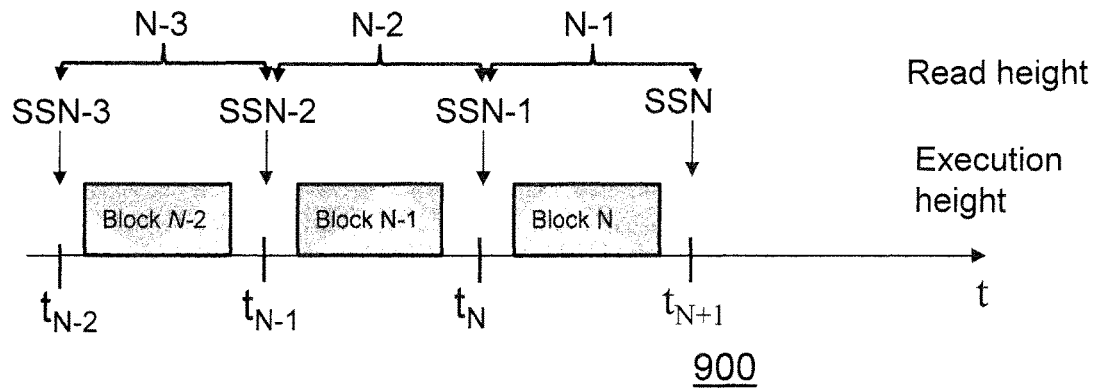
FIG. 9 illustrates a timing diagram of execution cycles as well as corresponding read cycles.

FIG. 9 illustrates a timing diagram of execution cycles performed by the messaging component 61 and the execution component 62 of FIG. 6 as well as corresponding read cycles performed by the state manager component 65 and the state reader component 69. The x-axis denotes the time t.

As described with reference to FIG. 7, the messaging component is clocked by input blocks IB produced by the consensus component. The input blocks are numbered by the consensus component in a consecutive order, denoted as execution height or height index and are processed by the messaging component in that order. The points in time $t_{N-2}$, $t_{N-1}$ and $t_N$ denote the start of the processing of the respective block with the execution heights N−2, N−1 and N respectively.

Every time before a new input block is processed in the messaging component 61, the messaging component 61 sends to the storage sub-component 810 of the state manager 800 a snapshot SS of the latest unit states of the computational unit. This snapshot SS is then stored during the processing and execution of the current input block, e.g. in a cache memory of the storage sub-component 810 and can be used for providing user access to the information of the snapshot via the state reader component 69. Hence according to such an embodiment there is always a delay of one height index between the input block that is currently processed and the currently available snapshot information of the latest snapshot SS. As an example, during the processing and execution of an input block with height index N, the available snapshot SSN-1 provides access to the snapshot information at the end of the processing of the input block with height index N-1. Accordingly, the read height is one block or one height index behind the current execution height.

During the processing and execution of an input block, the snapshot may be considered to be frozen, i.e. the stored snapshot information does not change during an execution of an input block.

Such an approach provides an elegant and efficient way to provide users access to the latest computational results of a computational unit. More particularly, users may perform read queries via the state reader component 69 with low latency. Furthermore, such an approach allows to provide users access to at least partly certified computational results of the respective computational unit.

According to embodiments, the state reader component 800 may also perform or trigger some processing on the snapshot data of the latest snapshot. More particularly, a read query may also involve the execution of a computation on or with the data of the read snapshot by a computational unit.

While a read query generally cannot affect the system state according to embodiments, it may nevertheless temporarily modify the user state of a computational unit according to embodiments, e.g. memories and tables of the computational unit. However, all such modifications are discarded once the read query has been fully processed. Such a processing of the snapshot data may be used to implement e.g. operations such as sorting or filtering the results before returning it to the user.

Figure 10:
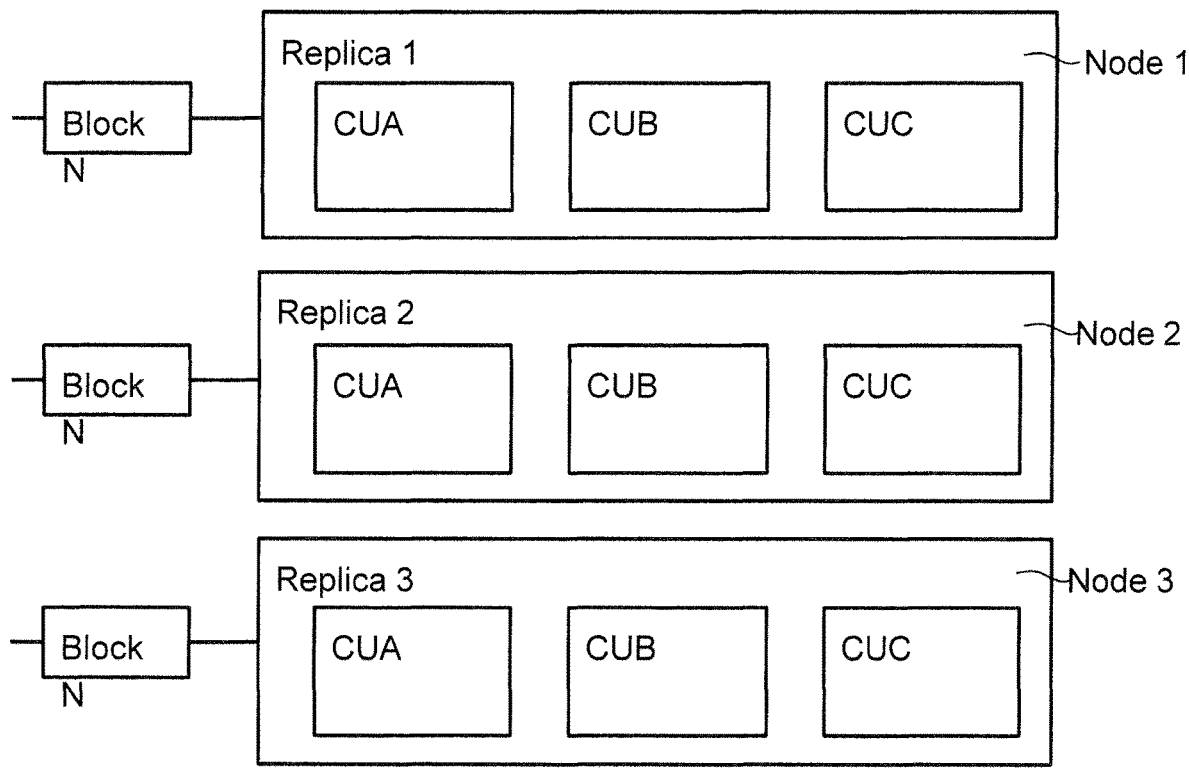
FIG. 10 illustrates in a simplified and schematic way the block by block processing of the input blocks performed by the messaging component and the execution component.

FIG. 10 illustrates in a simplified and schematic way the block by block processing of the input blocks which is performed by the messaging component 61 and the execution component 62. As described above, several execution messages are grouped together to form a block, but the execution messages keep their logical order within a block. Examples of execution messages, which may also be denoted as mutations are as follows:

User U requests execution of method M on computational unit B with arguments X.
Developer V requests installation of computational unit D with initial state S.
Developer V requests upgrade of computational unit D to computational unit D' with a state transition function S ↦ S'
Developer V requests removal of computational unit D.

While the execution messages are processed in an ordered way, read queries do not need to be ordered and several read queries may be processed in parallel.

According to this example it is assumed that the execution subset of the nodes of the underlying distributed network, in particular the nodes of a respective subnet, comprise three nodes Node 1, Node 2 and Node 3. Each of the three nodes runs a replica of three computational units CUA, CUB and CUC. Before starting the execution of block N, a snapshot of the latest unit state of the execution of block N-1 is stored as read snapshot. During the processing and execution of the current block N, the available snapshots stored by the storage component 810 of the state manager component 800 comprise the snapshots with the height or height index N-1 or lower. Accordingly, the state reader may read the snapshots of the height index K<N. While according to some embodiments, snapshots of more than one height or height index may be stored, according to other embodiments only the snapshot of the latest height index N-1 is stored, i.e. of the height index that is previous to the height index of the currently processed input block.

Figure 11:
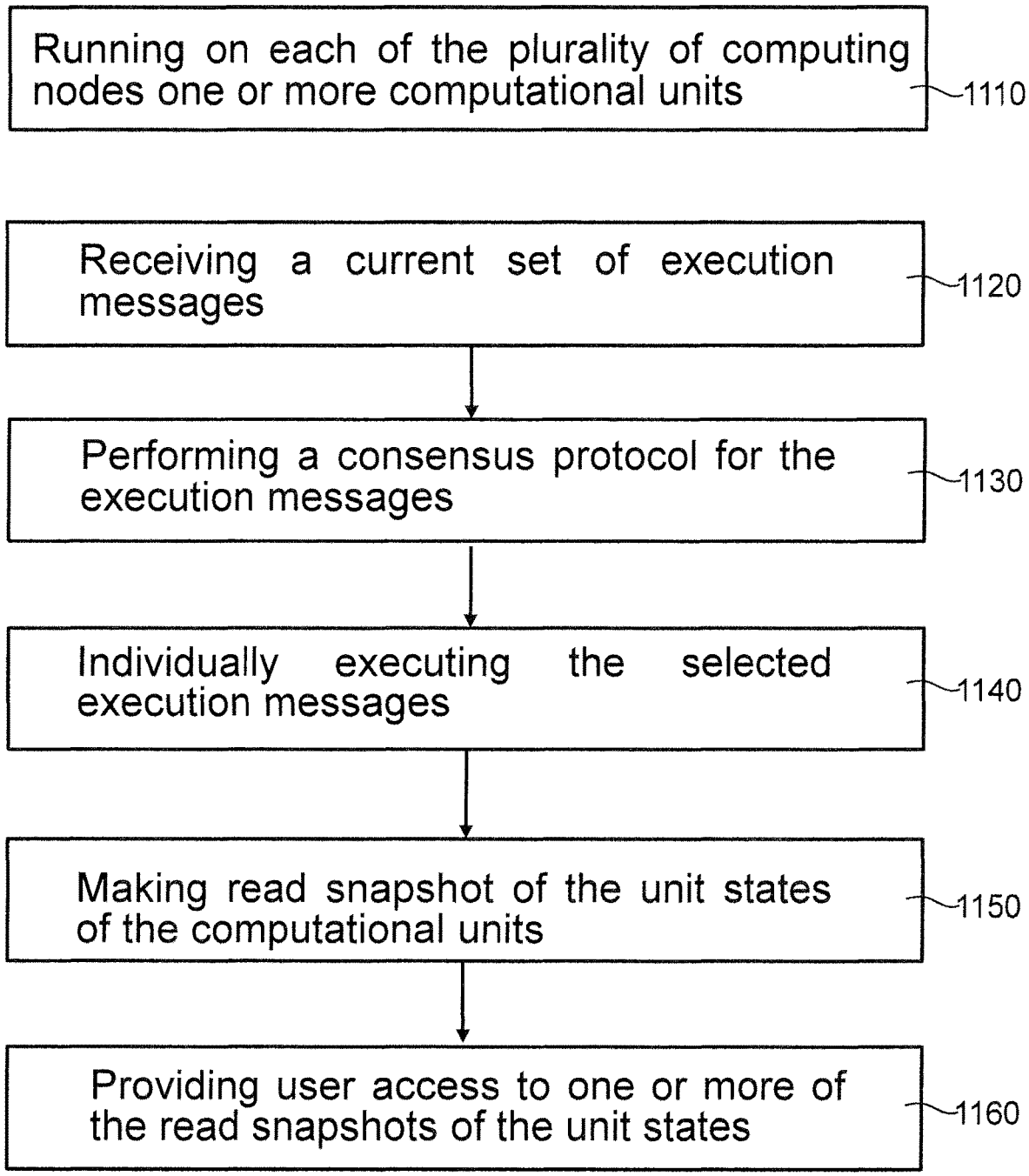
FIG. 11 shows method steps of computer-implemented method for providing a user of a distributed network access to computational results.

FIG. 11 shows method steps of a computer-implemented method for providing a user of a distributed network access to computational results. The computational results have been computed by the distributed network, more particularly by one or more computational units that run on the distributed network.

At a step 1110, each node of the plurality of nodes runs one or more computational units in a deterministic and replicated way. Each of the one or more computational units comprises its own unit state.

Step 1110 may be regarded as a general step that is performed continuously.

Steps 1120 to 1160 illustrate the processing and execution of execution messages and may be repeated in loops in a consecutive manner.

At a step 1120, the network or nodes of the network receive a set of execution messages that shall be executed.

At a step 1130, a consensus subset of the plurality of nodes performs a consensus protocol. The consensus protocol is configured to reach a consensus on a selection and processing order of execution messages from a current set of execution messages. The current set of execution messages may encompass unit-to-unit messages as well as ingress messages as described above. By means of the consensus protocol the consensus subset of the plurality of nodes agree on the selection and processing order of the execution messages.

At a step 1140, an execution subset of the nodes individually executes the execution messages that have been selected in the agreed processing order in a deterministic manner. This mutates the unit states of the one or more computational units which are involved in the execution.

At a step 1150, the nodes of the execution subset make a read snapshot of the latest unit states of the one or more computational units of the execution subset. The latest read snapshot comprises computational results of the execution messages. The making of the read snapshot may encompass additionally the certification of one or more parts of the read snapshot by the execution subset of the nodes. The certification may be performed in particular by executing a threshold-signature algorithm by the nodes of the execution subset.

At a step 1160, one or more nodes of the execution subset provide one or more users user access to the read snapshot of the unit states of the one or more computational units of the execution subset and therewith to the latest computational results of the corresponding computational units.

Figure 12:
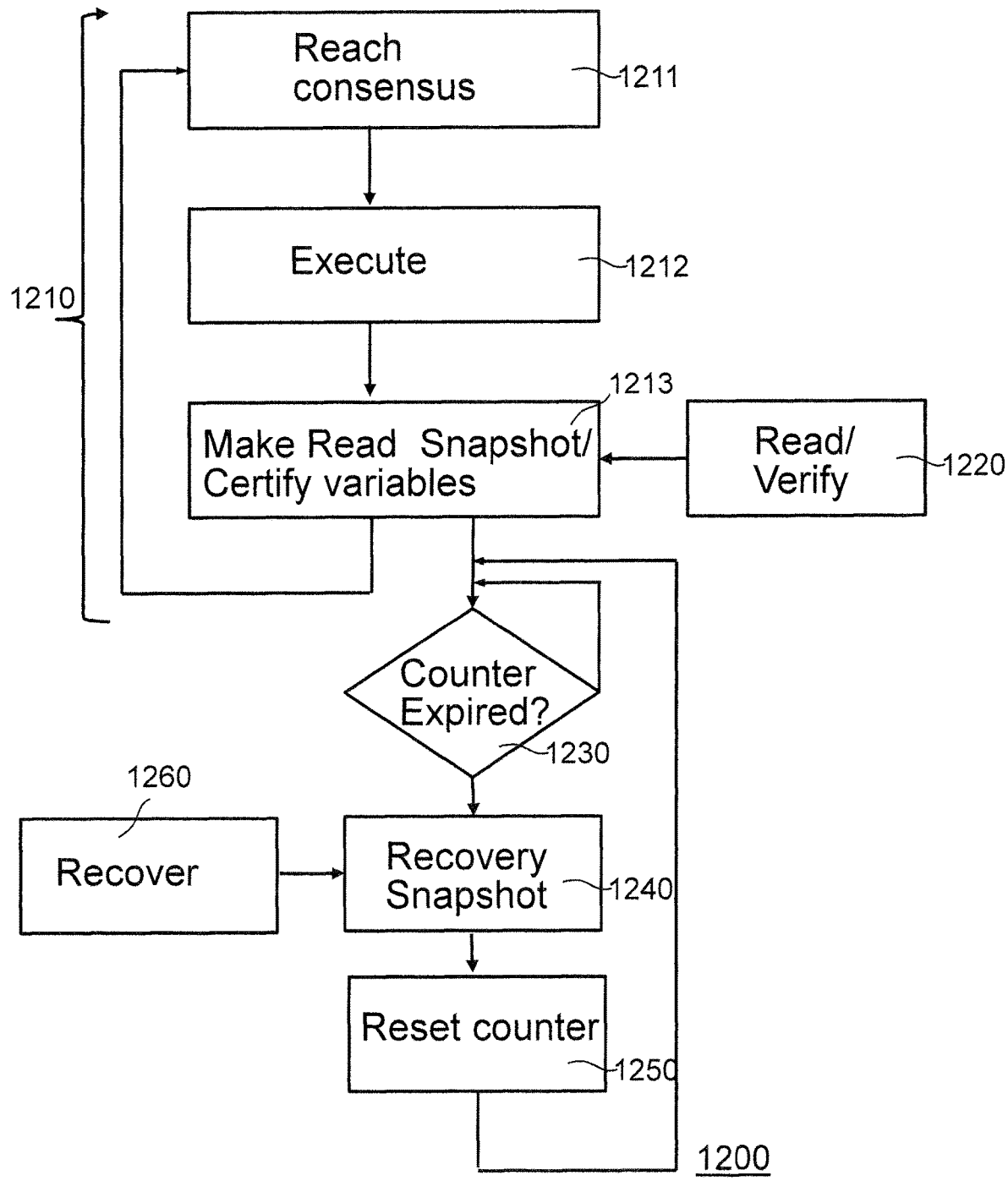
FIG. 12 shows a flow chart of further method steps of a method according to embodiments of the invention.

FIG. 12 shows a flow chart of method steps of a method according to a further embodiment of the invention.

The method performs a plurality of processing loops 1210 in a sequential order with an increasing height index N. N is an increasing integer, i.e. e.g. 0, 1, 2, 3 ... N. The processing loops 1210 encompass a first loop step 1211, a second loop step 1212 and a third loop step 1213.

At the first loop step 1211, a consensus subset of the nodes of the network performs the consensus protocol to reach a consensus on the selection and processing order of a current set of execution messages.

At the second loop step 1212, the computational units of the nodes of a execution subset, e.g. of a subnet, individually execute the selection of execution messages in a deterministic manner.

At the third loop step 1213, the nodes of the execution subset make a read snapshot and store it e.g. in a cache memory of the respective node. In addition, the nodes of the execution subset may certify one or more parts of the read snapshot.

Then the method continues with a subsequent processing loop 1210 during which another input block with a subsequent height index is processed. During this subsequent processing loop the latest read snapshot is available for read steps 1220. More particularly, during the processing loop with the height index N, one or more nodes of the execution subset may provide user access to the read snapshot made at the end of the loop with the previous height index N−1. The read steps 1220 may include a verification of the one or more certified parts, e.g. of the certified variables, by the user.

The read snapshots are performed regularly at the end of every processing loop 1210, in particular at the block boundaries between the processing of subsequent input blocks, and hence at a first rate. It should be noted that the first rate may be in particular determined and triggered by the input blocks. The first rate does not need to have fixed time intervals according to embodiments, but the time intervals may vary over time.

After each processing loop, at a step 1230, the respective node triggers a counter and checks whether the counter has expired. The counter may be embodied in various ways. In particular, it may be programmed to expire after a predefined number of processing loops 1210, e.g. after 100 processing loops 1210.

If the counter has expired, e.g. at every $100^{th}$ processing loop, the corresponding nodes perform, at a step 1240, a recovery snapshot, which may also be denoted as full snapshot. Such a recovery snapshot comprises all data that is needed to recover a node, e.g. in case of a node failure or system failure. Then, at a step 1250, the counter is reset.

In case of a system or node failure, the recovery snapshot may be used, at a recovery step 1260, to recover a node.

The recovery snapshots are performed at a second rate. As mentioned, the recovery snapshots are only performed at every x-th, e.g. every $100^{th}$ processing loop. Hence the first rate is higher than the second rate.

FIG. 13 illustrates main processes which are run on each node 10 of the networks 100, 300 according to an embodiment of the invention. A network client of networks according to embodiments of the invention is the set of protocol components that are necessary for a node 10 to participate in the network. According to embodiments, each node 10 is a member of a mainnet and of at most one subnet, which means that each node runs a client for the mainnet and possibly a client for the subnet.

A node manager 40 is configured to start, restart and update a mainnet protocol client 41, a subnet protocol client 42 and a security application 43.

According to embodiments, each of the plurality of subnets 11 is configured to run a separate subnet protocol client 42 on its corresponding nodes 10. The mainnet protocol client 41 is in particular configured to distribute configuration data to and between the plurality of subnets 11. The mainnet protocol client 41 may be in particular configured to run only system computational units, but not any user-provided computational units. The mainnet protocol client 41 is the local client of the mainnet and the subnet protocol client 42 is the local client of the subnet.

The security application 43 stores secret keys of the nodes 10 and performs all operations with them.

The security application 43 is configured to protect the secret keys held by a node. More particularly, the secret keys are held and processed in a separate execution environment (either a separate process or a separate virtual machine (VM). The security application 43 is configured to operate with limited and controlled interfaces such that the secret keys cannot be extracted via these interfaces. According to embodiments, the security application is configured to operate like a hardware security module (HSM) or similar to a HSM. Hence the security application 43 may be denoted as a Software HSM.

Figure 14:
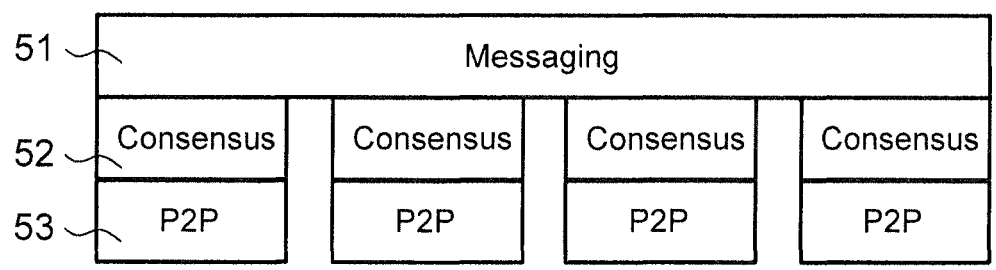
FIG. 14 shows a layer model illustrating main layers which are involved in the exchange of inter-subnet and intra-subnet messages.

FIG. 14 shows a layer model 1400 illustrating main layers which are involved in the exchange of inter-subnet and intra-subnet messages. The layer model 1400 comprises a messaging layer 51 which is configured to serve as an upper layer for the inter-subnet communication. More particularly, the messaging layer 51 is configured to route inter subnet messages between computational units of different subnets. Furthermore, the messaging layer 51 is configured to route ingress messages from users of the network to computational units of the network.

The layer model 1400 further comprises a plurality of consensus layers 52 which are configured to receive inter-subnet messages from different subnets as well as ingress messages and to organize them, in particular by agreeing on a processing order, in a sequence of input blocks which are then further processed by the respective subnet. In addition, the layer model 1400 comprises a peer-to-peer (P2P) layer 53 that is configured to organize and drive communication between the nodes of a single subnet.

According to embodiments, the network may comprise a plurality of further layers, in particular an execution layer which is configured to execute execution messages on the computational units of the network.

In the following the interactions between the mainnet protocol clients 41 and the subnet protocol clients 42 is described in more detail (see FIG. 13). The mainnet protocol clients 41 manage a number of registries that contain configuration information for the subnets. These registries are implemented by computational units on the mainnet and, as all nodes are participating in the mainnet, access to these registries can simply be implemented by a state read operation.

That is, the mainnet reader 610 (see FIG. 6) may be in fact a sub-component of the mainnet protocol client 41 and therefore interaction with this component results in interaction between the two isolated environments in which the mainnet and subnet clients run.

Figure 15:
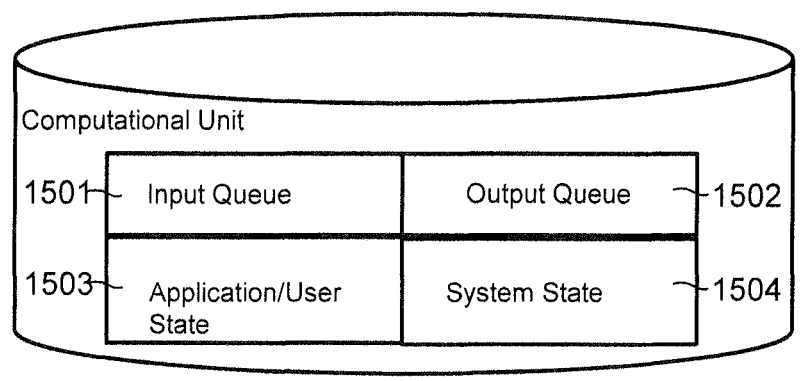
FIG. 15 shows a more detailed illustration of a computational unit according to an embodiment of the invention.

FIG. 15 shows a more detailed illustration of a computational unit 1500 according to an embodiment of the invention.

The computational unit 1500 comprises an input queue 1501, an output queue 1502, an user or application state 1503 and a system state 1504.

All input queues 1501 of a computational unit collectively make up the induction pool, but the input queues are part of the state of the computational unit. The output queues 1502 contain messages that need to be delivered to other computational units, possibly on other subnetworks.

The user state 1503 consists of a main Web Assembly (WASM) module which implements the functionality of the computational unit and its dependent modules, together with an instance of each of the modules. A WASM module instance consists of memories, global variables and tables.

The system state 1504 cannot be freely modified by code of the computational unit. It includes meta-data, other state maintained by system on behalf of the computational units, notably the compiled form of the WASM modules, and context and callbacks for outstanding messages.

Figure 16:
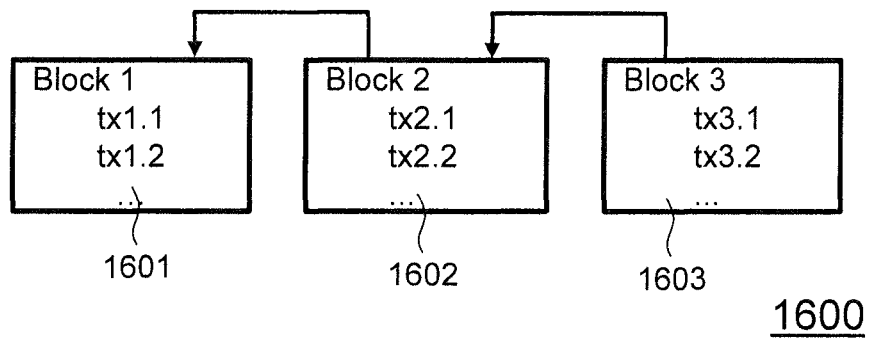
FIG. 16 illustrates the creation of input blocks by a consensus component according to an exemplary embodiment of the invention.

FIG. 16 illustrates the creation of blocks in distributed networks according to embodiments of the invention. The blocks may be in particular the input blocks 720 shown in FIG. 7 which are created by the consensus component 63 that runs the consensus protocol, in particular a local subnet consensus protocol.

In this exemplary embodiment three input blocks 1601, 1602 and 1603 are illustrated. Block 1601 comprises a plurality of transactions, namely the transactions tx1.1, tx1.2 and possibly further transactions indicated with dots. Block 1602 comprises also a plurality of transactions, namely the transactions tx2.1, tx2.2 and possibly further transactions indicated with dots. Block 1603 also comprises a plurality of transactions, namely the transactions tx3.1, tx3.2 and possibly further transactions indicated with dots. The input blocks 1601, 1602 and 1603 are chained together. More particularly, each of the blocks comprises a block hash of the previous block. This cryptographically ties the current block to the previous block(s).

According to embodiments the transactions may be inter-subnet messages, ingress messages and signalling messages.

According to embodiments, the input blocks 1601, 1602 and 1603 may be created by a proof-of-stake consensus-protocol.

However, it should be noted that the input blocks generated by the consensus component do not need to be chained together according to embodiments. Rather any consensus protocol that reaches some kind of consensus between the nodes of a subnet on the processing order of received messages may be used according to embodiments.

Figure 17:
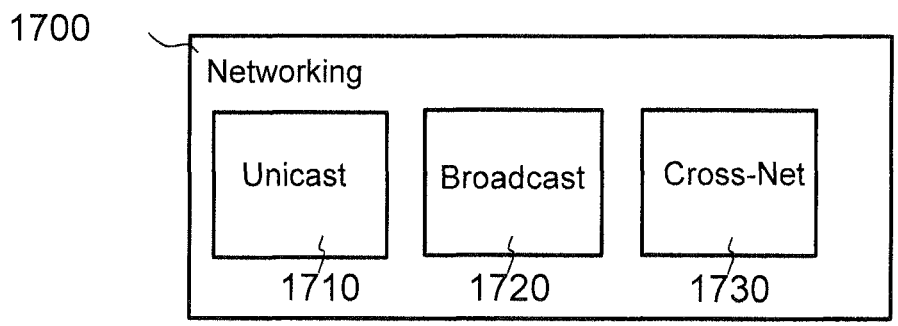
FIG. 17 shows a more detailed view of a networking component.

FIG. 17 shows a more detailed view of a networking component 1700, which is configured to run a networking protocol. The networking component 1700 may be e.g. a more detailed embodiment of the networking component 64 shown in FIG. 6. The networking component 1700 comprises a unicast component 1710 configured to perform a node-to-node communication, a broadcast component 1720 configured to perform an intra-subnet communication and a cross-net component 1730 configured to perform an inter-subnet communication.

Figure 18:
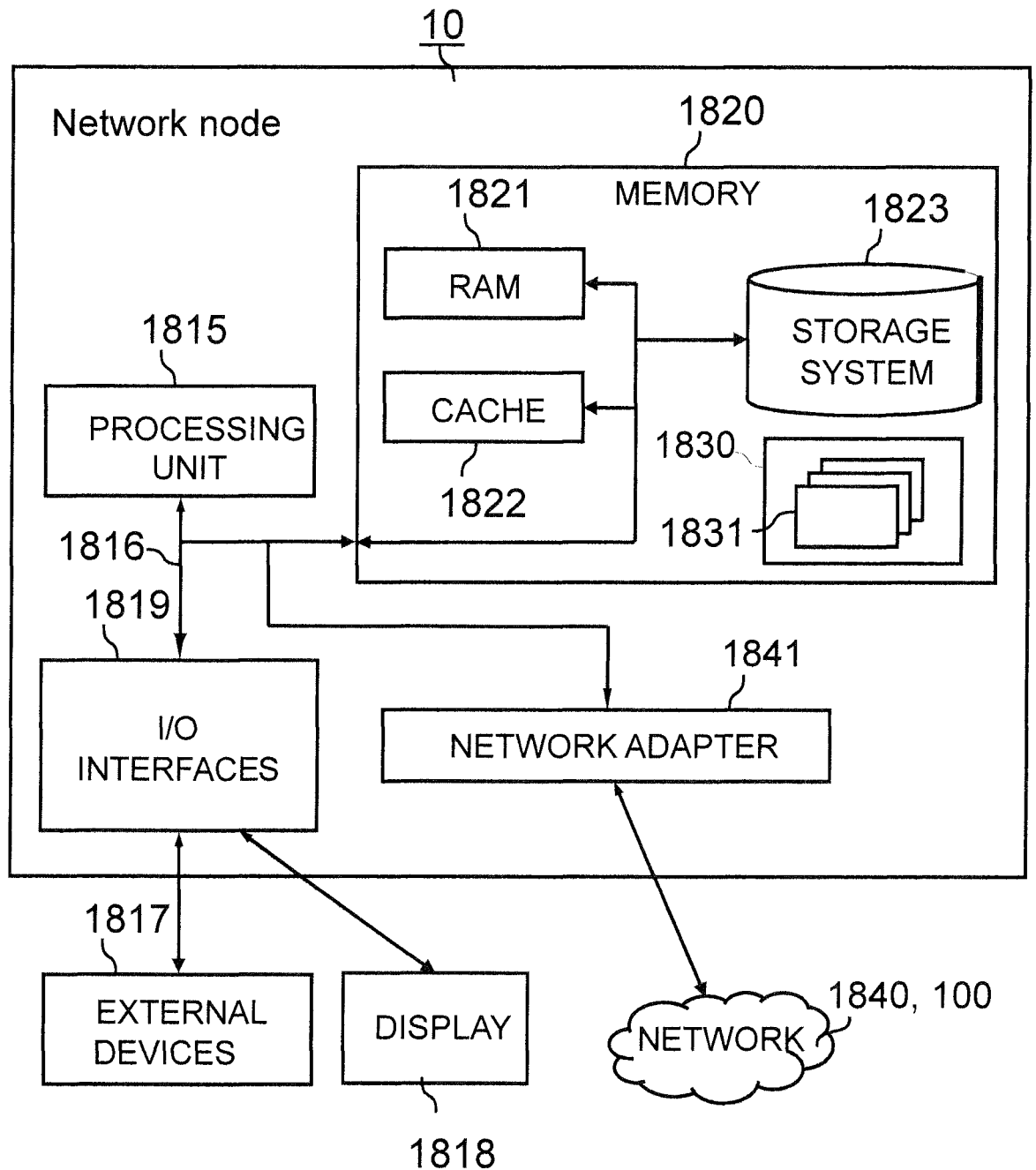
FIG. 18 shows an exemplary embodiment of a node according to an embodiment of the invention.

Referring now to FIG. 18, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform a computer-implemented method for providing a user of a distributed network access to computational results computed by the distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1815, a system memory 1820, and a bus 1816 that couples various system components including system memory 1820 to processor 1815.

Bus 1816 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1820 can include computer system readable media in the form of volatile memory, such as random access memory (RAM) 1821 and/or cache memory 1822. Network node 1810 may further include other removable/non-removable, volatile/non-volatile computer system storage media. By way of example only, storage system 1823 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1816 by one or more data media interfaces. As will be further depicted and described below, memory 1820 may include at least one computer program product having a set (e.g., at least one) of program modules that are configured to carry out the functions of embodiments of the invention.

Program/utility 1830, having a set (at least one) of program modules 1831, may be stored in memory 1820 by way of example, and not limitation, as well as an operating system, one or more application programs, other program modules, and program data. Each of the operating system, one or more application programs, other program modules, and program data or some combination thereof, may include an implementation of a networking environment. Program modules 1831 generally carry out the functions and/or methodologies of embodiments of the invention as described herein. Program modules 1831 may carry out in particular one or more steps of a computer-implemented method for providing a user of a distributed network access to computational results computed by the distributed network, e.g. of one or more steps of the methods as described above.

Network node 10 may also communicate with one or more external devices 1817 such as a keyboard or a pointing device as well as a display 1818. Such communication can occur via Input/Output (I/O) interfaces 1819. Still yet, network node 10 can communicate with one or more networks 40 such as a local area network (LAN), a general wide area network (WAN), and/or a public network (e.g., the Internet) via network adapter 1841. According to embodiments the network 1840 may be in particular a distributed network comprising a plurality of network nodes 10, e.g. the network 100 as shown in FIG. 1. As depicted, network adapter 1841 communicates with the other components of network node 10 via bus 1816. It should be understood that although not shown, other hardware and/or software components could be used in conjunction with network node 10.

Figure 19:
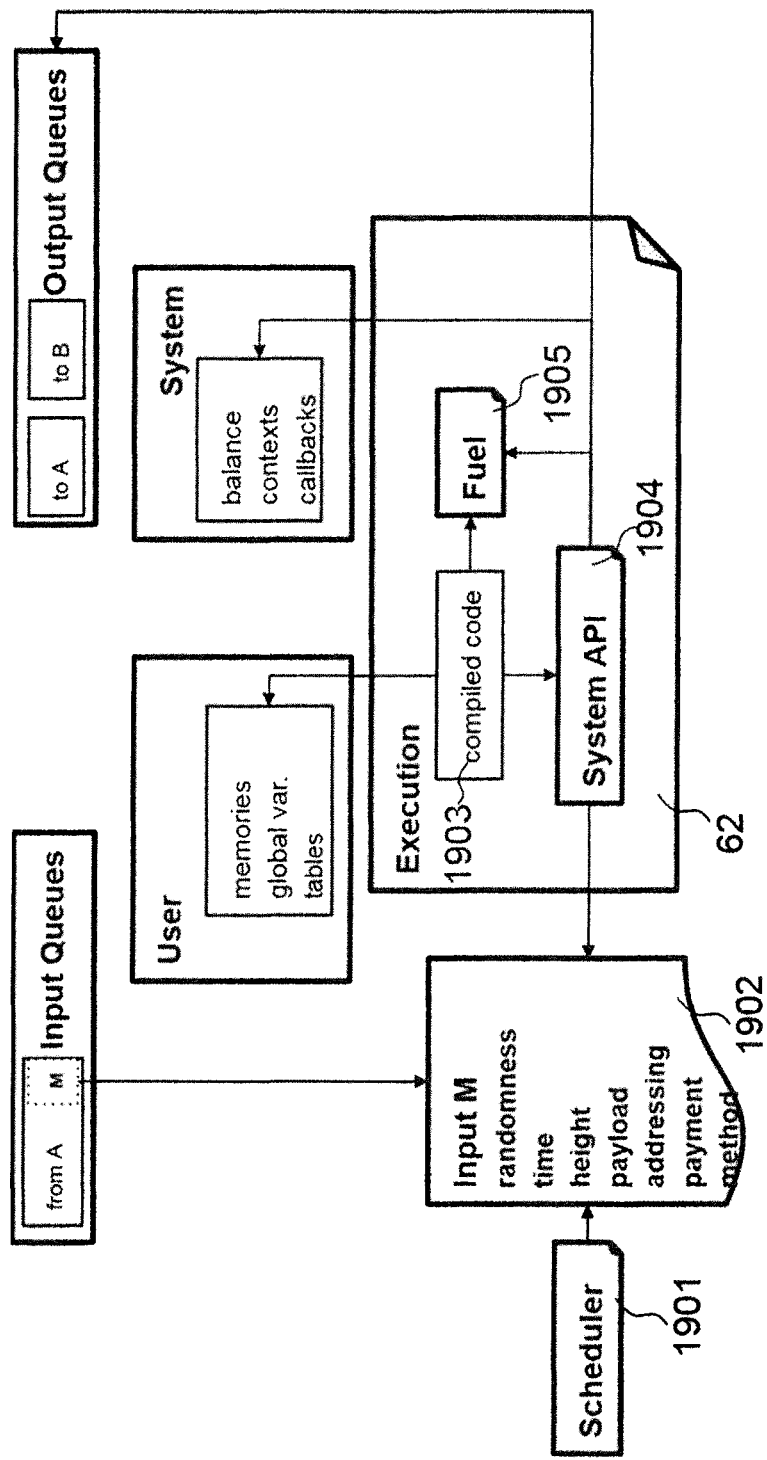
FIG. 19 illustrates the coordination of the different parts of a computational unit to execute a message.

FIG. 19 illustrates how the execution component 62 (see FIG. 6) coordinates the different parts of a computational unit to execute a message M.

To execute one message M from one input queue, the execution component 62 coordinates the different parts of the unit state with the various fields of M and data from a scheduler 1901 of the messaging component 61 and executes the right piece of compiled code.

The execution component 62 receives inputs 1902 as follows: Randomness, time, and height are provided by the scheduler. The message payload comes directly from the message M, i.e., it is not interpreted by the system. Addressing and payment are also part of the information in M. Finally, which method to execute is also specified in M.

The compiled code 1903 interacts with the system through a System API 1904, which provides functions to access the input, to send messages (interacting with output queues, contexts, and callbacks), respond to the current message (interacting with the context), and to transfer payment from the message to its balance.

According to embodiments, the execution component 62 may also comprise a fuel component 1905 which may also be denoted as gas component. The compiled code and the system API are instrumented by the fuel component which terminates execution when a limit is reached. The amount of fuel consumed is also given back to the scheduler 1901 which invoked the execution.

The compiled code is executed paired with a specific module instance that ensures that loads and stores go to the right persistent memory location, that global variables are persisted between invocations and that the right functions are executed when tables are used.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising a plurality of nodes, wherein each of the plurality of nodes is configured to run one or more computational units and each of the computational units comprises its own unit state; wherein the network is configured to
    individually execute, by an execution subset of the plurality of nodes, a set of execution messages in a deterministic manner, thereby mutating the unit states of one or more of the computational units of the execution subset;
    regularly make, by the execution subset, a read snapshot of the unit states of the one or more computational units of the execution subset;
    provide, by one or more nodes of the execution subset, user access to the read snapshot; and
    regularly perform, by a consensus subset of the plurality of nodes, a consensus protocol configured to reach a consensus on a selection of execution messages from a currently available set of the set of execution messages,
    wherein the consensus protocol is configured to
        receive and process the execution messages from the currently available set of execution messages;
        generate a queue of input blocks from the execution messages according to a predefined consensus mechanism; and
        provide the queue of input blocks to a messaging protocol,
    wherein the messaging protocol is configured to
        process the input blocks and to schedule the execution messages of the input blocks for execution, and
        be clocked by the input blocks received from the consensus protocol,
    wherein each node of the execution subset comprises a state manager component configured to manage and store the read snapshot, and
    the state manager component is configured to make the read snapshot at processing boundaries of the input blocks.

2. A distributed network according to claim 1, wherein the network is configured to
    execute, by a computational unit of one or more nodes of the execution subset, a computation on the read snapshot; and
    provide, by the computational unit, a result of the computation to a user.

3. A distributed network according to claim 1, wherein the network is configured to
    receive, by one or more of nodes of the execution subset, a read query from a user;
    load, by the one or more nodes of the execution subset, the unit state of a corresponding computational unit associated with the read query;
    run the corresponding computational unit with the read query; and
    return, by the one or more nodes of the execution subset, a result of the read query, wherein the read query does not persistently change the unit state.

4. A distributed network according to claim 1, wherein the network is further configured to
    certify one or more parts of the read snapshot, thereby generating one or more certified parts of the read snapshot.

5. A distributed network according to claim 4, wherein the network is further configured to certify the one or more parts of the read snapshot by
    generating, by a majority of the execution subset, a signature on the one or more certified parts of the read snapshot; and
    making the signature available to a user.

6. A distributed network according to claim 4, wherein the one or more certified parts of the read snapshot are variables of at least one of the unit states of the one or more computational units of the execution subset.

7. A distributed network according to claim 1, wherein the network is configured to
    regularly make, by the execution subset, a recovery snapshot of the unit states of the one or more computational units of the execution subset;
    certify, by a majority of the nodes of the execution subset, the recovery snapshot; and
    wherein the recovery snapshot is a snapshot that comprises all state of nodes of the execution subset that is needed to restore a node.

8. A distributed network according to claim 7, wherein the network is configured to store the recovery snapshot persistently at least until a subsequent recovery snapshot has been made.

9. A distributed network according to claim 7, wherein the network is configured to perform the read snapshot at a first rate and the recovery snapshot at a second rate, wherein the first rate is higher than the second rate.

10. A distributed network according to claim 1, wherein the execution messages encompass unit-to-unit messages exchanged between computational units of the network and mutating queries received from a user of the network; wherein the mutating queries are queries which change the unit state of the respective computational unit that is executing the respective mutating query.

11. A distributed network according to claim 1, wherein
    each node of the consensus subset comprises a consensus component configured to perform the consensus protocol; and
    each node of the execution subset comprises
        an execution component configured to execute the selection of execution messages;
        a messaging component configured to receive the selection of execution messages from the consensus component and to provide the selection of execution messages to the execution component;
        a state reader component configured to handle read queries from users of the network; and/or
        an ingress message handler component configured to handle mutating queries from users of the network.

12. A distributed network according to claim 1, wherein the network is configured to perform a plurality of processing loops in a sequential order with an increasing height index N, wherein N is an increasing integer, the plurality of processing loops being configured to
    perform, at a first loop step, the consensus protocol;
    individually execute, at a second loop step, the selection of execution messages;
    make, at a third loop step, the read snapshot; and
    provide, during one of the plurality of processing loops with the height index N, user access to the read snapshot made at the end of a previous height index N−1.

13. A distributed network according to claim 1, wherein the consensus protocol is further configured to add one or more execution parameters to the input blocks, the execution parameters being selected from the group consisting of:

a random seed;
a designated execution time; and
a height index.

14. A distributed network according to claim 1, wherein the distributed network comprises a plurality of subnets;
each of the plurality of nodes is allocated to one of the plurality of subnets;
each of the plurality of nodes is configured to run a mainnet protocol client and a subnet protocol client, wherein
the subnet protocol client is configured to
regularly perform the consensus protocol;
individually execute the selection of execution messages;
regularly make the read snapshot; and
provide user access to the read snapshot; and
the mainnet protocol client is configured to distribute configuration data to the plurality of subnets.

15. A computer-implemented method for providing a user of a distributed network access to computational results computed by the distributed network, the distributed network comprising a plurality of nodes, the method comprising:
running, on each of the plurality of nodes, one or more computational units, wherein each of the one or more computational units comprises its own unit state;
individually executing, by an execution subset of the plurality of nodes, a set of execution messages in a deterministic manner, thereby mutating the unit states of one or more of the computational units of the execution subset;
regularly making, by the execution subset, a read snapshot of the unit states of the one or more computational units of the execution subset;
providing, by one or more nodes of the execution subset, user access to the read snapshot; and
regularly performing, by a consensus subset of the plurality of nodes, a consensus protocol configured to reach a consensus on a selection of execution messages from a currently available set of the set of execution messages,
wherein the consensus protocol is configured to
receive and process the execution messages from the currently available set of execution messages;
generate a queue of input blocks from the execution messages according to a predefined consensus mechanism; and
provide the queue of input blocks to a messaging protocol,
wherein the messaging protocol is configured to
process the input blocks and to schedule the execution messages of the input blocks for execution, and
be clocked by the input blocks received from the consensus protocol,
wherein each node of the execution subset comprises a state manager component configured to manage and store the read snapshot, and
the state manager component is configured to make the read snapshot at processing boundaries of the input blocks.

16. A node for a distributed network, the node comprising:
a processor; and
a memory;
wherein the processor is configured to
run one or more computational units, wherein each of the computational units comprises its own unit state;
individually execute a set of execution messages in a deterministic manner, thereby mutating the unit states of one or more of the computational units;
regularly make a read snapshot of the unit states of the one or more computational units;
provide user access to the read snapshot; and
regularly perform a consensus protocol configured to reach a consensus on a selection of execution messages from a currently available set of the set of execution messages,
wherein the consensus protocol is configured to
receive and process the execution messages from the currently available set of execution messages;
generate a queue of input blocks from the execution messages according to a predefined consensus mechanism; and
provide the queue of input blocks to a messaging protocol,
wherein the messaging protocol is configured to
process the input blocks and to schedule the execution messages of the input blocks for execution, and
be clocked by the input blocks received from the consensus protocol,
wherein a state manager component is configured to manage and store the read snapshot, and
the state manager component is configured to make the read snapshot at processing boundaries of the input blocks.

17. A computer program product for operating a distributed network, the distributed network comprising a plurality of nodes, wherein each of the plurality of nodes is configured to run one or more computational units and each of the computational units comprises its own unit state; the computer program product comprising a computer readable storage medium having program instructions embodied therewith, the program instructions executable by one or more of the plurality of nodes to cause the one or more of the plurality of nodes to perform a method comprising:
individually executing, by an execution subset of the plurality of nodes, a set of execution messages in a deterministic manner, thereby mutating the unit states of one or more of the computational units of the execution subset;
regularly making, by the execution subset, a read snapshot of the unit states of the one or more computational units of the execution subset;
providing, by one or more nodes of the execution subset, user access to the read snapshot; and
regularly performing, by a consensus subset of the plurality of nodes, a consensus protocol configured to reach a consensus on a selection of execution messages from a currently available set of the set of execution messages,
wherein the consensus protocol is configured to
receive and process the execution messages from the currently available set of execution messages;
generate a queue of input blocks from the execution messages according to a predefined consensus mechanism; and
provide the queue of input blocks to a messaging protocol,
wherein the messaging protocol is configured to
process the input blocks and to schedule the execution messages of the input blocks for execution, and
be clocked by the input blocks received from the consensus protocol, wherein each node of the execution subset comprises a state manager component configured to manage and store the read snapshot, and the state manager component is configured to make the read snapshot at processing boundaries of the input blocks.

18. A computer program product for operating a node of a distributed network, the computer program product comprising a computer readable storage medium having program instructions embodied therewith, the program instructions executable by the node to cause the node to perform a method comprising:

running one or more computational units, wherein each of the computational units comprises its own unit state;

individually executing a set of execution messages in a deterministic manner, thereby mutating the unit states of one or more of the computational units;

regularly making a read snapshot of the unit states of the one or more computational units;

providing user access to the read snapshot; and regularly performing a consensus protocol configured to reach a consensus on a selection of execution messages from a currently available set of the set of execution messages, wherein the consensus protocol is configured to
receive and process the execution messages from the currently available set of execution messages;
generate a queue of input blocks from the execution messages according to a predefined consensus mechanism; and
provide the queue of input blocks to a messaging protocol, wherein the messaging protocol is configured to
process the input blocks and to schedule the execution messages of the input blocks for execution, and
be clocked by the input blocks received from the consensus protocol, wherein a state manager component is configured to manage and store the read snapshot, and the state manager component is configured to make the read snapshot at processing boundaries of the input blocks.

* * * * *